United States Patent [19]

Tanaka et al.

[11] Patent Number: 5,522,090
[45] Date of Patent: May 28, 1996

[54] MAGNETIC TAPE LIBRARY SYSTEM WHEREIN WRITE REQUEST TO A STORAGE UNIT TO BE MOUNTED IS REDIRECTED TO A TEMPORARY DEVICE, AND THEN TRANSFERRED TO THE STORAGE UNIT AT AN ARBITRARY TIME LATER WHEN THE UNIT IS MOUNTED

[75] Inventors: Kazuaki Tanaka, Yokohama; Tatsuo Namba; Minoru Kosuge, both of Odawara, all of Japan

[73] Assignee: Hitachi, Ltd., Tokyo, Japan

[21] Appl. No.: 194,373

[22] Filed: Feb. 8, 1994

[30] Foreign Application Priority Data

Feb. 10, 1993 [JP] Japan ................................. 5-022389

[51] Int. Cl.⁶ ........................................................ G06F 12/00
[52] U.S. Cl. .................... 395/894; 395/492; 364/DIG. 1; 364/236.4; 364/256.6; 364/DIG. 2; 364/963.3
[58] Field of Search ........................................ 395/835, 894, 395/444, 489, 492, 497.01

[56] References Cited

U.S. PATENT DOCUMENTS

| | | | |
|---|---|---|---|
| 4,974,156 | 11/1990 | Harding et al. | 395/489 |
| 4,987,533 | 1/1991 | Clark et al. | 395/600 |
| 5,239,650 | 8/1993 | Hartung et al. | 395/650 |
| 5,353,422 | 10/1994 | Kobayashi et al. | 395/497.01 |
| 5,386,516 | 1/1995 | Monahan et al. | 369/30 |
| 5,418,971 | 5/1995 | Carlson | 395/800 |
| 5,423,018 | 6/1995 | Dang et al. | 395/486 |
| 5,469,560 | 11/1995 | Beglin | 395/439 |

FOREIGN PATENT DOCUMENTS 3-205649  9/1991  Japan.

*Primary Examiner*—Thomas C. Lee
*Assistant Examiner*—D. Dinh
*Attorney, Agent, or Firm*—Fay, Sharpe, Beall, Fagan, Minnich & McKee

[57] ABSTRACT

In an automatic library system for transportable data storage units, a library storage control reduces the chances of contention for file mounting. The magnetic tape library system 3 includes first read/write apparatus 20 with automatic mounting and second read/write apparatus 30 not requiring automatic mounting. Depending on the utilization of the first read/write apparatus 20, write data is recorded temporarily in a common storage installed in the second read/write apparatus 30. When the utilization of the first read/write apparatus 20 is low, the temporarily stored data is automatically transferred to a data storage unit in the first read/write apparatus 20 in which the data should normally be stored. The handlers and the first read/write apparatus 20 can be used with priority for handling data storage units for read data that require transport from the storage shelf or holder. The apparent number of the read/write apparatus increases by an amount equal to the number of data writes, improving the system throughput.

28 Claims, 7 Drawing Sheets

| FILE ID (101) | TAPE ID (103) | ACCESS MODE (105) | R/W APPARATUS ID (107) | HANDLER FLAG (109) | USER ID (111) | USER FLAG (113) | ... |
|---|---|---|---|---|---|---|---|

FILE MANAGEMENT TABLE

FIG. 3

| TOTAL NUMBER READ WRITE APPARATUS (201) | R/W APPARATUS ID (203) | TOTAL NUMBER OF FILE ID'S (205) | FILE ID (207) | TAPE ID (209) | PART-WAY RECORDING INFORMATION (211) | |
|---|---|---|---|---|---|---|
| 1 | PID 1 | 3 | F11<br>F12<br>F13 | DID11<br>DID12<br>DID13 | | INFO 11<br>INFO 12<br>INFO 13<br>... |
| 2 | PID 2 | 2 | F21<br>F22 | DID21<br>DID22 | | INFO 21<br>INFO 22 |

WRITE DATA MANAGEMENT TABLE

FIG. 4

MAGNETIC TAPE

MAGNETIC TAPE LIBRARY SYSTEM WHEREIN WRITE REQUEST TO A STORAGE UNIT TO BE MOUNTED IS REDIRECTED TO A TEMPORARY DEVICE, AND THEN TRANSFERRED TO THE STORAGE UNIT AT AN ARBITRARY TIME LATER WHEN THE UNIT IS MOUNTED

BACKGROUND OF THE INVENTION

The present invention relates to an automatic warehouse system for information data storage devices or units such as magnetic tapes and optical disks and more particularly to an information storage control system for such storage devices or units.

There are systems that automatically install transportable data storage units such as magnetic tapes and optical disks into a read/write apparatus for reading and writing data to and from the data storage units. Among them, there is known an automatic warehouse system for storage devices (hereinafter referred to as a data storage unit library system).

The magnetic tape library system has a storage shelf or holder to store several thousand to tens of thousands of data storage units. In response to a mount request from a higher-level system, a robot or handler picks up a certain data storage unit from the shelf, and transports and mounts the data storage unit to and on the read/write apparatus. Upon receiving a demount request from the higher-level system, the handler takes the data storage unit out of the read/write apparatus, and transports it to and puts it on the storage shelf.

The magnetic tape library system spends a greater amount of time before a file can become available for use than is taken by a direct access storage device represented by a magnetic disk device. This is because the magnetic tape library system requires a picking time for the handler to become available for picking up from the shelf the data storage unit in which a desired file is recorded, a carry time for the handler to carry the data storage unit to the read/write apparatus, a mount time for the data storage unit to be mounted on the read/write apparatus, and an access time for the read/write head to be positioned at the file. For this reason, the magnetic tape library system is used mainly as a storage equipment for file backup and data archival storage, rather than as an on-line storage equipment.

In such a magnetic tape library system, a mount/demount method is known which determines a data storage unit that is likely to be used in the future according to such information as a past utilization record of the storage devices and a job execution schedule, and then mounts it on the read/write apparatus to reduce the time taken by the mounting and demounting of the storage device, thus improving the efficiency of data storage unit mounting and demounting. One such method is described, for example, in Japanese Patent Laid-Open No. 205649/1991, which corresponds to U.S. application Ser. No. 07/591,233 now U.S. Pat. No. 5,353,422.

SUMMARY OF THE INVENTION

In recent years, an increased storage capacity realized by an improved recording density of data storage units and an increased number of data storage units accommodated in the magnetic tape library equipment achieved by an enlarged scale of the library equipment have led to increases in the total storage capacity of the magnetic tape library system and in the number of files contained in the data storage units.

As the number of files increases, the number of file accesses made in each magnetic tape library system also increases. Hence, unless the number of read/write apparatus in which the data storage units are mounted and the number of handlers that carry the data storage units to the read/write apparatus are increased, there will be a greater possibility of access contention among higher-level systems in using the read/write apparatus. In a conventional magnetic tape library system, however, because the data storage units are automatically mounted and demounted by the handler, the read/write apparatus can be installed only in locations facing the range of travel of the handler, making it difficult to increase the number of data storage units. Increasing the number of handlers is also difficult because of interference between the handlers. These problems result in the data storage units often having to wait to be mounted in the read/write apparatus, deteriorating the system throughput efficiency.

Since the magnetic tape library system is generally used by a plurality of higher-level systems, there is a concern that as the number of cases of mount-waiting increases, the probability of a deadlock (a condition in which the temporary storage necessary to store the mount waiting information is full and no more requests from the higher-level systems can be taken by the library system) will also increase in which only a part of the data storage units required by these higher-level systems is mounted leaving the higher-level systems waiting for the remaining data storage units to be mounted, further deteriorating the throughput.

Even with a method that controls the mounting and demounting according to the prediction of future use of data storage units, when there is a plurality of higher-level systems that make data access requests or when otherwise a large number of data access requests are made per unit of time, it is difficult to avoid contention between mount requests for the read/write apparatus.

It is an object of this invention therefore to provide a data storage unit library system that solves the above-mentioned problems, minimizes reduction in the throughput caused by an increased number of file accesses and thereby reduces the probability of coming into a deadlock.

The present invention magnetic tape library system is used mainly for storing or backing up files and data used by higher-level systems. Hence, the access mode of the mount request from the higher-level system is often a write only or a read only mode and there is a relatively long time span between the data being written and the recorded data being read out. This characteristic is utilized. When a mount request for mounting a data storage unit is made by the higher-level system, an access mode for a file in the data storage unit to be accessed is also specified. A second data storage mounted in a second read/write apparatus, which has no interface with the handler, is temporarily used for recording data into files. In intervals between the processing requests made by the higher-level system, as when the utilization of the read/write apparatus is low, the first data storage unit containing the file, in which the data recorded in the second data storage should normally be stored, is mounted in the read/write apparatus to transfer the data recorded in the second data storage to the first data storage unit. Such a magnetic tape library system as described here permits the read/write apparatus, for which the data storage unit mounting is performed by the handler, to be used with priority for executing the mount requests for those data storage units containing read data that are required to be transported from the shelf. As a result, the apparent number of read/write apparatus can be increased by an amount equal to the number of write only files, thereby improving the system throughput and reducing the chances of deadlock.

BRIEF DESCRIPTION OF THE DRAWING

Further objects, features, and advantages of the present invention will become more clear from the following detailed description of a preferred embodiment, as shown in the accompanying drawing, with modifications, wherein.

DETAILED DESCRIPTION OF A PREFERRED EMBODIMENT

Figure 1:
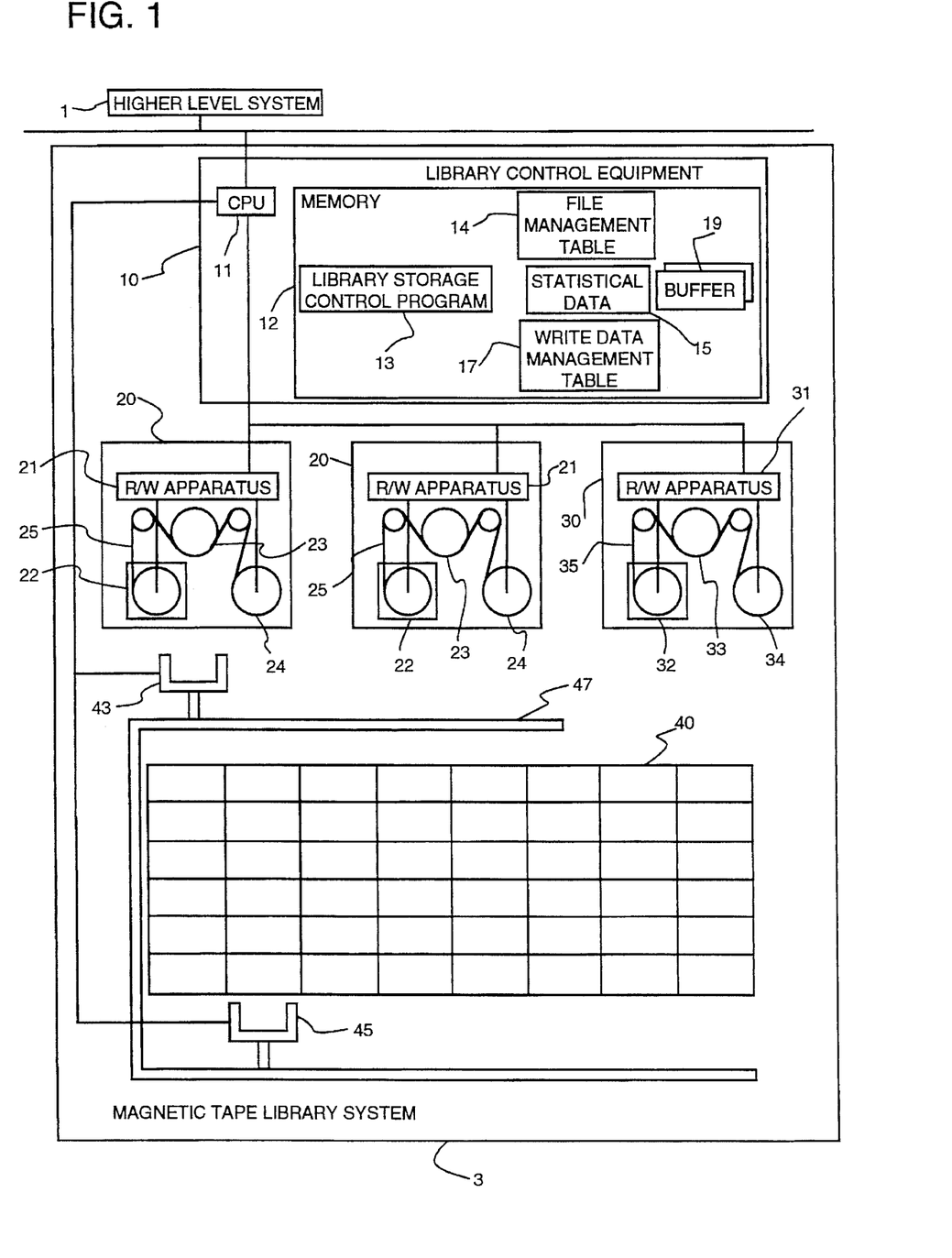
FIG. 1 is an overall configuration of one embodiment of this invention.

FIG. 1 is an overall configuration of the preferred embodiment of the magnetic tape library system according to this invention.

In FIG. 1, a higher-level system, which may include a computer or closely coupled computers or a network of computers, and a magnetic tape library system 3 are connected. The magnetic tape library system 3 is an example of a data storage unit library system including read/write apparatus 20, 30 for reading and writing information used by the higher-level system 1 to and from a magnetic tape, which along with optical disks are examples of a data storage unit; a rack, holder or shelf 40 holds magnetic tapes; handlers 43, 45 travel on a rail 47 to carry tapes between the read/write apparatus 20, 30 and the shelf 40; and a library control 10 controls the operation of the read/write apparatus 20, 30 and the handlers 43, 45 according to commands or requests from the higher-level system 1. In this embodiment, there are two kinds of read/write apparatus: one kind 20 has an interface with the handlers 43, 45 and the other kind 30 does not have such an interface. Each magnetic tape 25 is encased in a magnetic tape cartridge 22, and a large number of magnetic tape cartridges are held in the shelf 40.

The read/write apparatus 20, 30 accommodate magnetic tape cartridges 22, 32. The read/write apparatus 20, 30 each have system reels 24, 34 to wind up the magnetic tapes 25, 35 fed out from the magnetic tape cartridges 22, 32; read/write heads 23, 33 to read and write information to/from the magnetic tapes 25, 35; and read/write control apparatus 21, 31 to control reading and writing of information to/from the magnetic tapes 25, 35.

The library control 10 has a CPU (Central Processing Unit) 11 and a memory 12. The memory 12 includes: a library storage control program 13 for controlling the storage in the library equipment; a file management table 14 to record information about the files contained in the tapes mounted in the read/write apparatus 20; statistical data 15 representing the statistics of frequency of use of the read/write apparatus 20; a write data management table 17 that represents information on data recorded in the tapes installed in the read/write apparatus 30; and a buffer 19 to temporarily store write data sent from the higher-level system 1 or read data from the read/write apparatus 20, 30. It is noted that the memory 12 has an area reserved for storing an operating system, a work area required for executing the library storage control program 13 and other areas for storing variables not directly connected with this invention are not shown here for the purpose of simplifying the disclosure. The storage units and storage devices have random access relatively permanent storage as distinguished from the mere saving of buffers and volatile storage of RAM.

Figure 2:
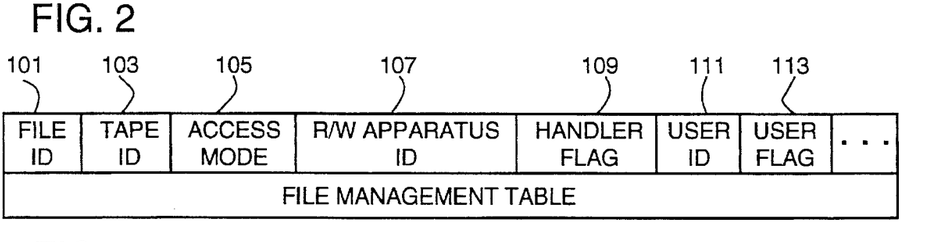
FIG. 2 is a logical configuration of the file management table.

FIG. 2 shows one example of a logical configuration of the file management table 14.

The file management table 14, as shown in FIG. 2, includes: a file ID (identifier) 101 to specify a file; a storage device ID 103 to specify a magnetic tape cartridge in which the file is generated; an access mode ID 105 indicating whether the file access mode is a write only mode or a read only mode, or a read/write mode; read/write apparatus ID 107 specifying one of the plural read/write apparatus 20 in which a tape cartridge containing the file is installed; a flag 109 indicating whether the read/write apparatus has an interface with the handlers 43, 45; a user ID 111 specifying a user or higher-level system using that file; and a use flag 113 indicating whether the file holding data storage unit is mounted or waiting to be demounted. The identifiers each exists in numbers corresponding to the number of magnetic tape cartridges installed in the read/write apparatus.

Figure 3:
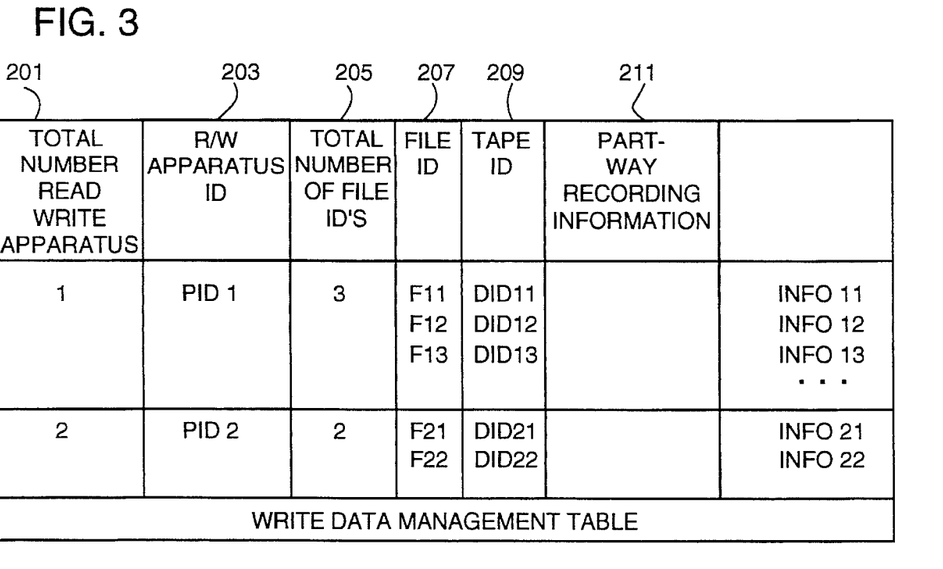
FIG. 3 is a logical configuration of the write data management table.

FIG. 3 shows one example of a logical configuration of the write data management table.

The write data management table 17, as shown in FIG. 3, includes: a read/write apparatus number 201 indicating the number or identification of one of read/write apparatus 30 that do not have an interface with at least the handlers 43, 45; a read/write apparatus ID 203 individually specifying one of plural read/write apparatus 30 (only one apparatus 30 shown); a file number 205 indicating the number of files whose data is recorded in the read/write apparatus; a file ID 207 specifying these files; a storage device ID 209 specifying the magnetic tape cartridges 22, in which these files are to be stored; and part-way recording information 211 indicating where in the file specified by the tape ID 209 and the file ID 207 the data held in the magnetic tape cartridge 32 installed in the read/write apparatus 30 specified by the read/write apparatus ID 203 should be transferred. The read/write apparatus ID 203, file number 205, file ID 207, storage device ID 209 and part-way recording information 211 each exist in numbers/quantities specified by the read/write apparatus number 201 used as a key.

In this embodiment, the library system 3 has first read/write apparatus 20 that have automatic mounting of the magnetic tape cartridge 22 and second read/write apparatus 30 without the automatic mounting function (i.e. without an interface with the handlers). The library control unit 10 controls the library system 3 as follows. When the frequency of use of the first read/write apparatus 20 is high and there is a file A to be processed by only the write operation, then the library control unit 10 makes it appear, to the higher-level system/as if a magnetic tape cartridge 32 (which is installed in the second read/write apparatus 30 and different from a target magnetic tape cartridge 22 in which the file should normally be recorded) were the target magnetic tape cartridge 22 for that file A, in order to not require the time needed for the handlers to obtain the target cartridge 22 from the shelf 40; thus the library is operated to load a great number of other files that require reading in the first read/write apparatus 20. The operation of this system will be described below.

The read/write controls 21, 31 in the read/write apparatus 20, 30 wind the magnetic tapes 25, 35 encased in the magnetic tape cartridges 22, 32 around the systems reels 24, 34 and control the writing and reading of data to and from the magnetic tapes 25, 35 through the read/write heads 23, 33.

Figure 4:
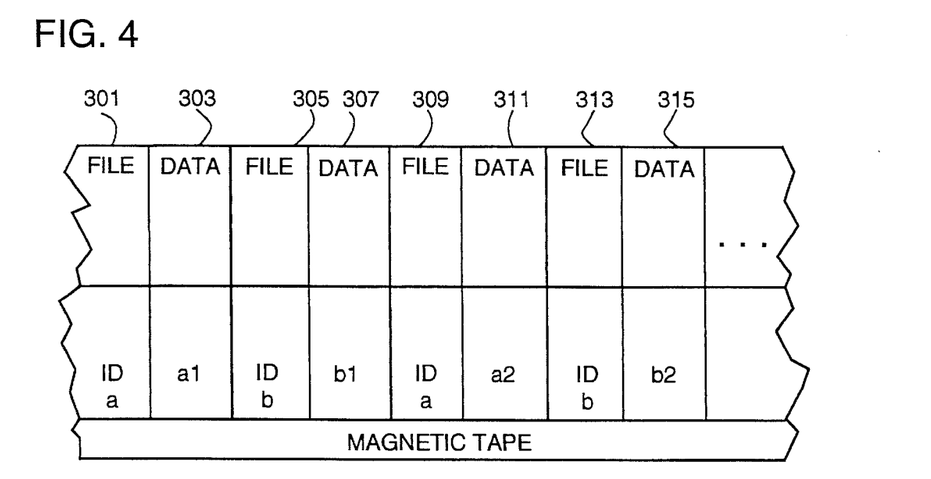
FIG. 4 is an arrangement of file data in the magnetic tape.

One magnetic tape may include at least one file. Data in each file may be divided into sections, as shown in FIG. 4, and two or more file data may be written on the tape randomly, each accompanied by a file identifier to specify which file the data represents. In the case of FIG. 4, two file data—data "a1" 303 and data "a2" 311 identified by the file ID "a" 301, 309 and data "b1" 307 and data "b2" 315 identified by the file ID "b" 305, 313—exists intermingled, i.e. randomly. In reading data that was recorded in this manner on the magnetic tape, a processing selects only the data of a target file ID, e.g. a or b. The data may be compressed when recorded on the magnetic tape and expanded when read out.

Figure 5:
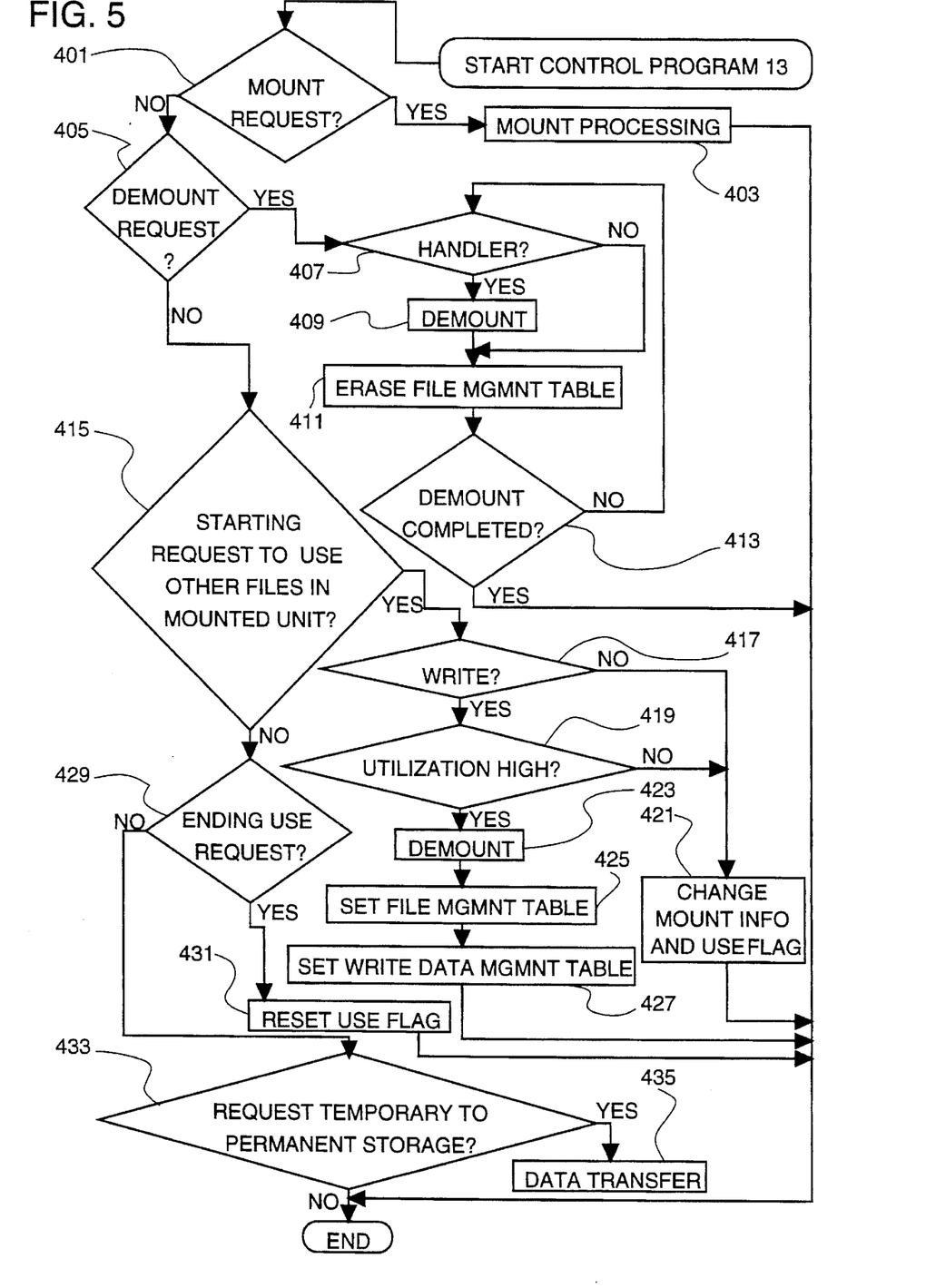
FIG. 5 is a processing flow diagram of the library storage control program.

Next, the processing performed by the library storage control program 13 will be explained in detail by referring to FIG. 5.

The library storage control program 13, upon receipt of a request from the higher-level system 1, is started and executed by the CPU 11.

Figure 6:
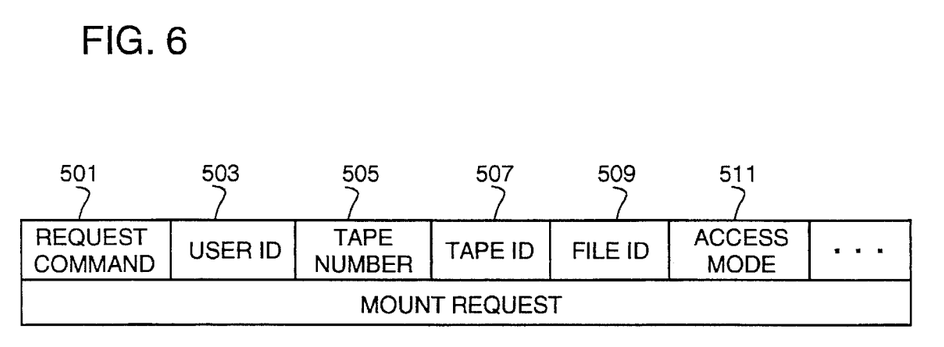
FIG. 6 is a logical configuration of the mount request issued from a higher-level system.

When the library storage control program 13 receives a request from the higher-level system 1, the library storage control program 13 checks if the request is a mount request or not (step 401). The mount request from the higher-level system 1, as shown in FIG. 6, includes information such as: a request command 501 indicating that this is a mount request; a user ID 503 that identifies a user when the library system 3 is used by two or more users; a number 505 indicating the total number of the magnetic tape cartridges that are requested to be mounted; tape IDs 507 assigned respectively to each magnetic tape cartridge for identification; a file ID 509 for specifying a file to be used among the files contained in the magnetic tape cartridge identified by the storage device ID 507; and an access mode 511 indicating the mode of access to the file specified by the file ID 509, i.e. indicating whether the file is to be read only, written only or read and written. The storage device ID 507, file ID 509 and access mode 511 are included in numbers/quantities specified by the storage device number 505.

If the decision at step 401 is YES, the processing proceeds to a step 403 to control the handlers 43, 45 to mount in the read/write apparatus 20 the magnetic tape cartridge 22 specified by the higher-level system 1. Then the processing is ended. The detail of the mount processing of step 403 will be given later.

Figure 8:
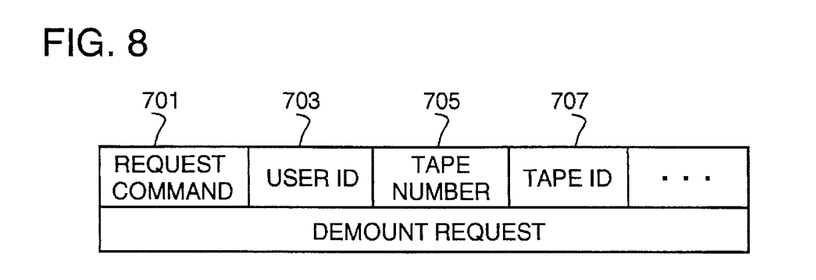
FIG. 8 is a logical configuration of the demount request issued from the higher-level system.

When the step 401 has found that the request from the higher-level system is not the mount request, the request is further checked whether the request is a demount request (step 405). The demount request from the higher-level system 1 includes, as shown in FIG. 8, a request command 701 indicating that this is a demount request, a user ID 703, a number 705 indicating the total number of magnetic tape cartridges to be demounted, and one or more tape IDs 707 identifying the magnetic tape cartridges to be demounted. The number of tape IDs 707 is specified by the number 705.

When the step 405 has found the request from the higher-level system 1 to be a demount request, the program references the file management table 14 to check if the magnetic tape cartridge requested for demounting is mounted in one of the read/write apparatus 20 with an interface with the handlers 43, 45 (step 407). If the demount-requested magnetic tape cartridge is mounted in the read/write apparatus 20, a demount processing is done to rewind the magnetic tape in that magnetic tape cartridge and transport the magnetic tape cartridge from the read/write apparatus 20 to the shelf 40 (step 409). Then, information in the file management table 14 corresponding to the just demounted magnetic tape cartridge is erased (step 411) and a check is made to see if the processing of demounting all of the magnetic tape cartridges requested to be demounted by the higher-level system 1 has been completed (step 413). If the demounting processing is not yet completed, the step 407 and subsequent steps are repeated for the next tape cartridge to be demounted until the remaining magnetic tape cartridges are all demounted, after which the processing is ended.

At step 405, when the request from the higher-level system 1 is neither a mount nor a demount request, it is now checked whether there is the start request that calls for use of a file in a tape cartridge already mounted in a read/write apparatus 20, 30 (step 415). The start request from the higher-level system 1 may contain the same kinds of information as in the mount request.

If the decision result at step 415 is YES, then it is checked whether the file access mode specified is the write only (step 417). When the access mode is found to be the write only, the statistical data 17 is referenced to see whether the utilization of the read/write apparatus 20 is high, i.e. if the utilization is in excess of a preset or predetermined value (step 419). If it is decided that the utilization of the read/write apparatus 20 is high, the magnetic tape cartridge demount processing (step 423) similar to the step 409 is performed and the corresponding magnetic tape cartridge mounting destination contained in the file management table 14 is changed to the read/write apparatus 30 which has no handler (step 425). Then, the file information indicating that the file exists in the storage device mounted in the read/write apparatus 30 is set in the write data management table 17 (step 427). Then the processing is terminated.

If the step 417 or step 419 produces a decision result of NO, the corresponding file ID 101 and the access mode 105 in the file management table 14 are replaced with the specified file ID and access mode (step 421) before ending the processing.

If the step 415 produces a decision result of NO, it is checked whether the request from the higher-level system is calling for ending the use of the file (step 429). It is noted that the request from the higher-level system may include information of the same configuration as the mount request.

When the request is found to be a use ending request, the use flag 113 in the file management table 14 corresponding to the file in the magnetic tape cartridge is turned off (step 31), before ending the processing.

If the decision result of the step 429 is NO, it is further checked to see if the request is a transfer request that calls for transferring the data—which is recorded in the file in the magnetic tape cartridge mounted in the read/write apparatus with no interface with the handlers 43, 45—to the file in the magnetic tape cartridge in which the data should normally be recorded (step 433). It is noted that the transfer request from the higher-level system need only include the request command indicating that the request is a transfer request. It is of course possible to limit the data transfer to those files having the user ID's specified by the higher-level system or to those files specified by the higher-level system.

When the request from the higher-level system is the transfer request, the data in the file in the magnetic tape cartridge mounted in the read/write apparatus having no interface with the handlers 43, 45 is transferred to a file in the magnetic tape cartridge in which it should normally be recorded (step 435). Then, the processing is finished.

When the decision result at step 433 is NO, a check is made of the contents of the request from the higher-level system 1 and processing is done according to the request (steps not shown in the drawing and which are conventional). Among other requests, there are ones calling for writing, reading, erasing and initializing data in the file in the mounted magnetic tape cartridge. These requests, however, are not described here as they are not directly related with this invention.

Figure 7A:
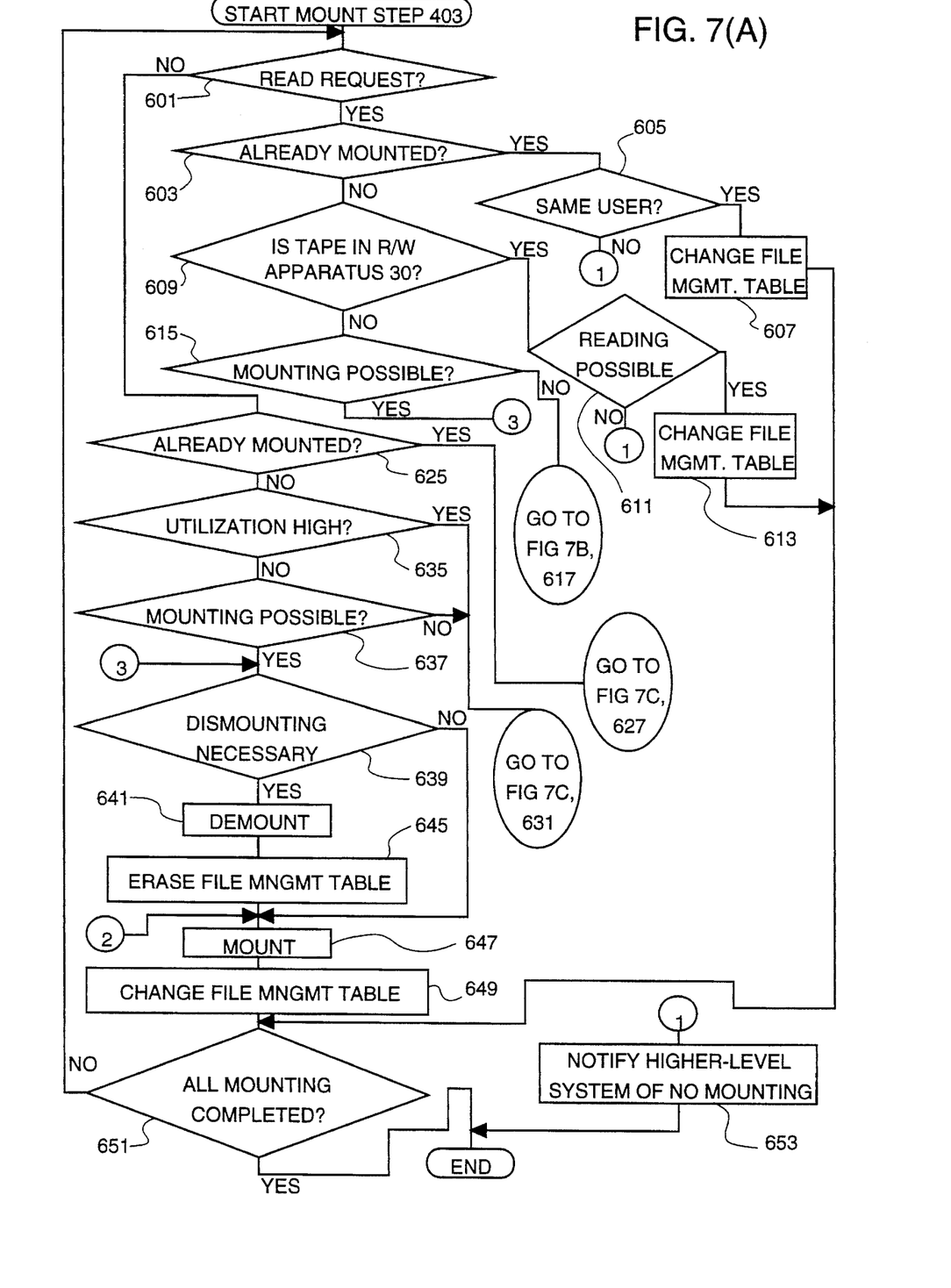
FIGS. 7A–7C is a flow diagram of the mount processing.
Figure 7B:
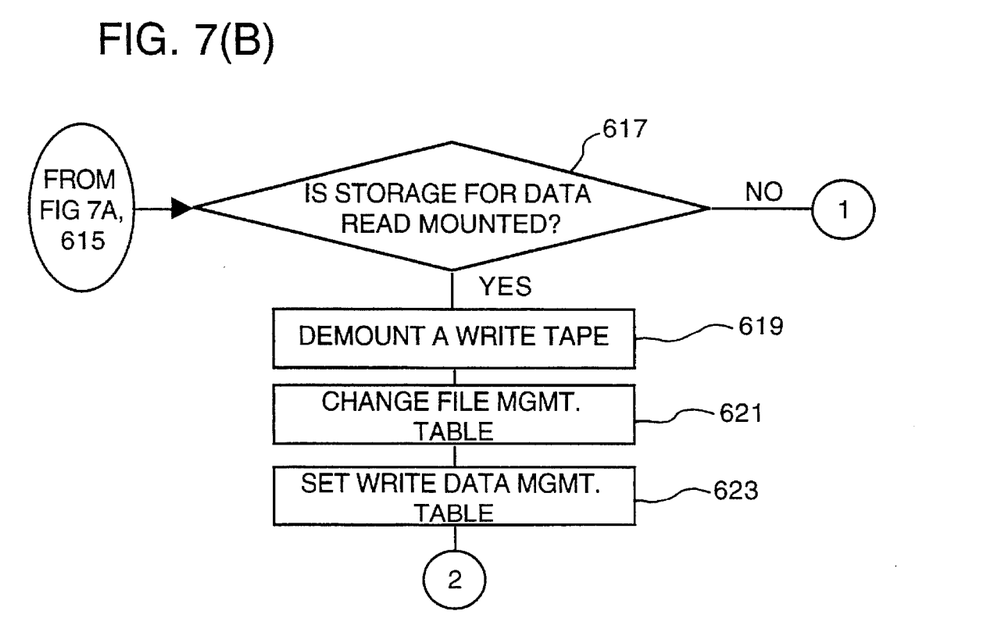
Figure 7C:
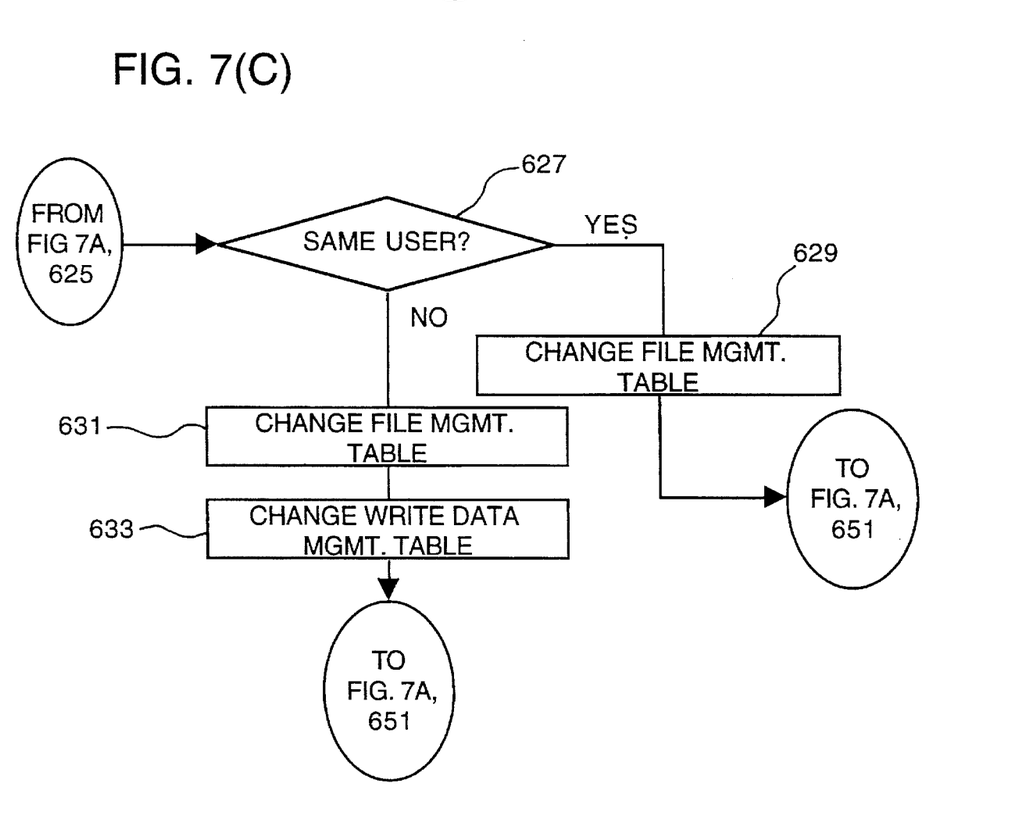

Detail of the mount processing at the step 403 will be described by referring to FIG. 7.

The mount processing first checks the access mode 511, which is supplied when the mount request is made, to see if the mount request is accompanied by data reading (step 601). If the decision made by the step 601 is YES, then the mount processing checks the file management table 14 to determine whether the corresponding magnetic tape cartridge is already mounted in the read/write apparatus 20 (step 603). If the step 603 produces the decision result of YES, the user ID 111 in the file management table 14 is checked to see if the request is made by the same user (step 605). When this decision of step 605 is NO, the processing goes to step 653 when the higher-level system 1 is notified that there is no space available in the read/write apparatus 20 in which to mount the corresponding magnetic tape cartridge. Then the processing is ended. If the decision result at step 605 is YES, the mount processing changes the file ID 101 in the file management table 14 corresponding to the file in the magnetic tape cartridge to the one specified by the file ID 509, also changes the access mode 105 to the one specified by the access mode 511, and turns on the use flag 113 (step 607), thereafter executing a step 647 and the following steps.

When the decision result at step 603 is NO, the mount processing checks the handler flag 109 in the file management table 14 corresponding to the magnetic tape cartridge specified by the tape ID 507 to determine whether the magnetic tape cartridge requested for mounting is already mounted in the read/write apparatus 30 with no interface with the handlers 43, 45 (step 609). If this decision is YES, a further check is made to see if it is possible to read data by this read/write apparatus 30 (step 611). Whether the data read is possible or not with the read/write apparatus 30 is determined by checking the conditions of use of the library system 3—e.g. whether the read/write apparatus 30 in question is already in use, whether the utilization of the read/write apparatus 20 per unit of time recorded in the statistical data 15 is smaller than the predetermined value, whether the read/write apparatus 20 having an interface with the handlers 43, 45 can be used for the write only request, whether there is an ample vacant area in the buffer 19 in the memory 9 and it is not required to write into the read/write apparatus 30 for more than a predetermined time, and whether when one of a plurality of read/write apparatus 30 is used for data reading in response to the mount request, so that other reading operations are not kept waiting.

If the decision result at step 611 is NO, the procedure including and after step 653 is executed. When the result of step 611 is YES, the file ID 101, access mode 105 and user ID 111 in the file management table 14 corresponding to the file in the magnetic tape cartridge are changed to those requested by the higher-level system and the use flag 113 is set to ON (step 613) before proceeding to step 651.

When at step 609 the decision result is NO, it is checked whether there is any read/write apparatus 20 that is not used and in which the specified magnetic tape cartridge can be mounted. The decision on the presence or absence of the unused or idle read/write apparatus 20 is made by checking the file management table 14 to see if there is any use flag 113 that is turned off or if there is any read/write apparatus 20 whose ID is not set in the file management table 14 (step 615).

If the decision result at step 615 is NO, the access mode 105 and the handler flag 109 in the file management table 14 are checked to determine a magnetic tape cartridge with a handler and a write access mode, i.e. the cartridge used only for data writing is mounted in one of the read/write apparatus 20 (step 617). If there is any read/write apparatus 20 in which another magnetic tape cartridge used only for data write is mounted, then that cartridge is demounted and then carried by the handlers 43, 45 to the shelf 40 (step 619). Then, the read/write apparatus ID 107 in the file management table 14 corresponding to the just demounted another magnetic tape cartridge is changed to the read/write apparatus ID representing a read/write apparatus 30 and the flag 109 representing the presence of handler is changed to one representing the absence of handler (step 621). After this, the write data management table 17 is set with: a file ID concerning the demounted file, a storage device ID representing the magnetic tape cartridge in which the file should be recorded, and part-way recording information 211 indicating the position of data which is partly recorded in the just demounted another magnetic tape cartridge (step 623). This is followed by executing steps from 647 down with respect to the cartridge requested in the read request. If the step 617 has found that there is no read/write apparatus 20 in which the write-only magnetic tape cartridge is mounted, the processing notifies the higher-level system 1 of "mounting not possible" (step 653) and the mount step 403 is then terminated.

If the step 615 decides that it is possible to mount the requested magnetic tape cartridge, processing at and after step 639 is carried out.

Next, if the step 601 has found that the mount request received calls for mounting a magnetic tape cartridge for a file that requires data writing only, the mount processing checks the file management table 14 to decide if the magnetic tape cartridge in question is already mounted in the read/write apparatus 20 (step 625). When the magnetic tape cartridge is already mounted, the user ID in the file management table 14 is examined to see if the request was made from the same user (step 627). If the request is found to be made by the same user, the mount processing changes the file ID 101 in the file management table 14 corresponding to the file in the magnetic tape cartridge to the file ID specified by the mount request and also the access mode 105 to the specified access mode, and then changes the use flag 113 to ON (step 629). Then, the procedure at and following step 651 is carried out.

When the step 627 decides that the mount request is not from the same user, then the file ID, storage device ID, access mode, read/write apparatus ID and user ID for a file in the magnetic tape cartridge requested to be mounted are registered in the file management table 14. At the same time, the handler flag 109 is set to "no handler" and the use flag 113 is turned on (step 631). The write data management table 17 is also set with the file ID and the storage device ID representing the magnetic tape cartridge in which the file is to be recorded (step 633). After this, processing at and after step 651 is executed.

When the step 625 decides that the mount-requested magnetic tape cartridge is not mounted, the mount processing checks the statistical data 15 to see if the utilization of the read/write apparatus 20 is greater than the predetermined value (step 635). When the utilization of the read/write apparatus 20 is higher than the preset value, the processing from 631 down is executed. If the utilization of the read/write apparatus 20 is smaller, a check is made, in a similar manner to step 615, of whether there is any read/write apparatus 20 that is not currently used and can mount the magnetic tape cartridge mount-requested by the higher-level system 1 (step 637). When there is no read/write apparatus 20 in which to mount a cartridge, processing from 631 down is carried out.

When at step 637 it is decided that there is a read/write apparatus in which the mount-requested magnetic tape cartridge can be mounted, then another check is made of whether the read/write apparatus in question is already mounted with a magnetic tape cartridge and whether it is necessary to demount it (step 639). Here it is checked whether the read/write apparatus 20 in which the requested magnetic tape cartridge is to be mounted has been determined from the read/write apparatus IUD 107 that corresponds to the turned-off use flag 113 in the file management table 14 (step 639). If it is decided that demounting is necessary, the unused magnetic tape cartridge left mounted in the magnetic tape cartridge 20 is demounted and carried by the handlers 43, 45 to the shelf 40 (step 641) and then information set in the file management table 14 on the just demounted magnetic tape cartridge is deleted (step 645). After this, processing proceeds to step 647. When the step 639 finds that cartridge demounting is not needed, the processing moves directly to step 647.

At step 647 the mount processing is performed, that is, the specified tape cartridge is transported and mounted by the handlers 43, 45 into the read/write apparatus 20, in which it is wound forwardly so as to make the specified file accessible. Then, the file ID, storage device ID, access mode, read/write apparatus ID, handler flag, and user ID associated with the file in the mounted magnetic tape cartridge are registered in the file management table 14. At the same time, the use flag 113 is set to ON (step 649).

Finally, at step 651 it is checked whether the mount processing has been completed for all the magnetic tape cartridges that are mount-requested by the higher-level system 1. If there are any cartridges that have not completed the mount processing, the steps from 601 forward are repetitively performed until all of the requested magnetic tape cartridges are mounted, at which time the mount processing is ended.

Figure 9:
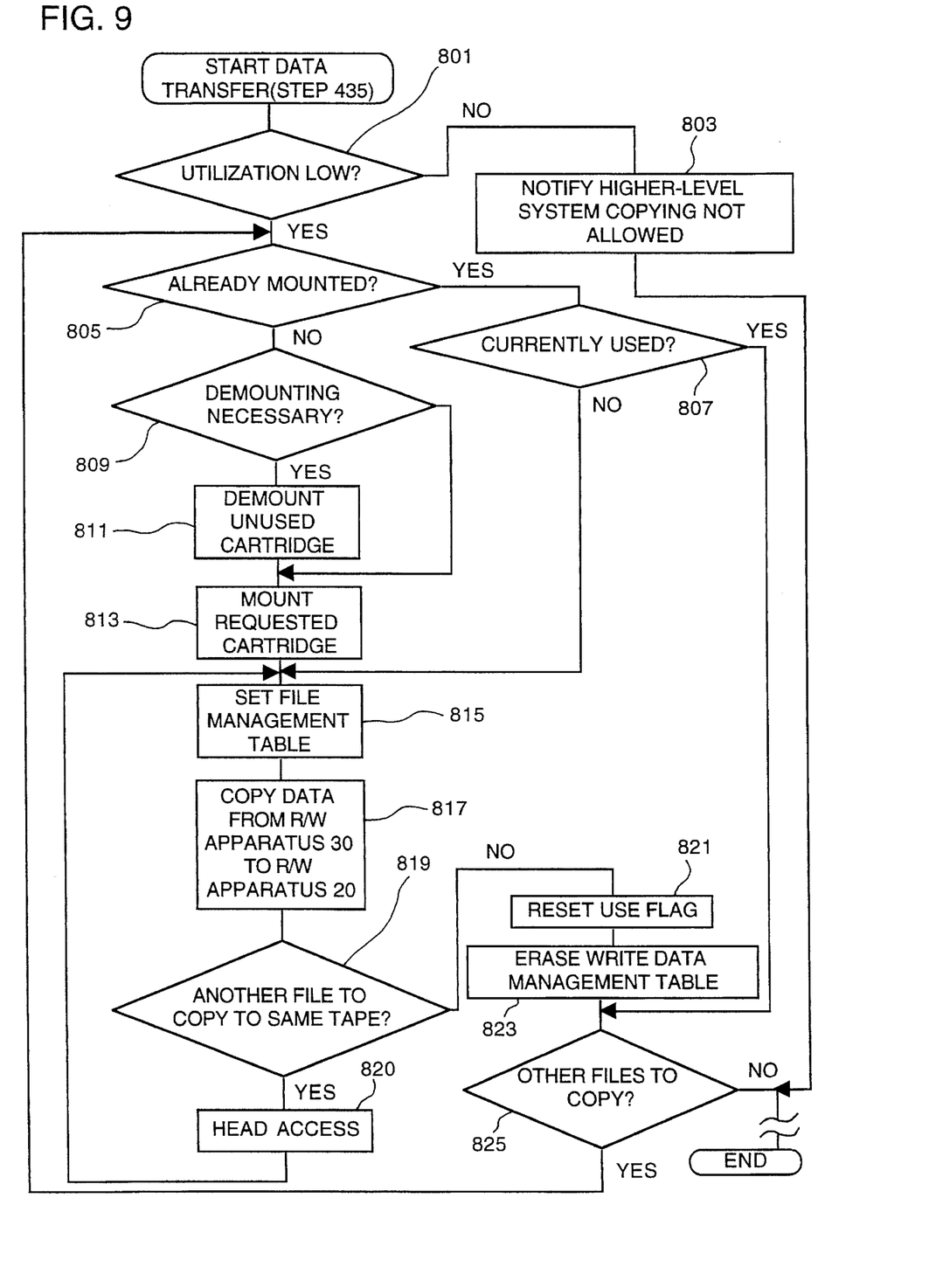
FIG. 9 is a processing flow diagram representing the transfer processing.

Next, the data transfer processing at step 435 of FIG. 5 will be explained in detail by referring to FIG. 9, which is the transfer of data temporarily stored in a tape cartridge 32 in read/write apparatus 30 to its true destination in a previously requested one of the cartridges 22.

The transfer processing first references the statistical data 15 to see if the utilization (e.g. time of use per unit of time) of the read/write apparatus 20 is smaller than a preset values step 801). When the utilization of the read/write apparatus 20 is in excess of the predetermined value, it is decided that the utilization of the read/write apparatus 20 is too high for the magnetic tape cartridge to be mounted in the apparatus to copy data from the cartridge and this decision is sent to the higher-level system 1 (step 803). Then the transfer processing is ended.

If the step 801 has found that the utilization of the read/write apparatus 20 is smaller than the predetermined value, the transfer processing checks the write data management table 17 to decide if the any requested magnetic tape cartridge is already mounted in the read/write apparatus 20 (step 805). When such a magnetic tape cartridge is already mounted in the read/write apparatus 20, the use flag 113 in the file management table 14 is examined to see if the magnetic tape cartridge in question is in current use (step 807). When the requested magnetic tape cartridge is being used, the transfer processing performs step 825. When that cartridge is not in use, processing from step 817 forward is carried out.

When the step 805 decides that there are no read/write apparatus 20 currently mounting the requested magnetic tape cartridge, a check is made to see if it is necessary to demount an unused magnetic tape cartridge from the read/write apparatus 20 in order to allow the requested magnetic tape cartridge to be mounted (step 809). When demounting is found necessary, a magnetic tape cartridge with an OFF use flag 113 in the file management table 14 is selected, demounted and then transported by the handlers 43, 45 to the shelf 40 (step 811). Then, the requested magnetic tape cartridge is picked up from the shelf 40 by the handlers 43, 45 and carried to the read/write apparatus 20, into which it is mounted so that the requested file can be accessed (step 813). Next the file ID 101, tape ID 103, access mode 105, read/write apparatus ID 107 and user ID 111 associated with the requested file are registered in the file management table 14; at the same time, the handler flag 109 in the file management table 14 is set to "handler present" and the use flag 113 is turned on (step 815).

After the mount processing for the requested magnetic tape cartridge is finished, data in a file in a magnetic tape cartridge mounted in the read/write apparatus 30 is copied into the destination file in the magnetic tape cartridge in which the data should have been recorded (step 817). At this point, when the write data management table 17 for that file is set with the part-way recording information 211, the data is copied from the source file in the read/write apparatus 30 into the originally requested copy destination file beginning with the position specified by the part-way recording information 211. After the copying is completed, the transfer processing references the write data management table 17 to check if there are any other files in the same magnetic tape cartridge 22 into which data is to be copied (step 819). When there are other such files, the source and destination magnetic tape cartridges are fed or rewound until the read/write heads 23, 33 can be positioned at the associated files (head access) (step 820). Then, the processing from step 815 forward is performed repetitively.

When the step 819 has found that there are no other files to be copied into the same magnetic tape cartridge 22, the transfer processing changes the use flag 113 in the file management table 14 corresponding to the files that have been copied to OFF (step 821) and erases information on that file from the write data management table 17 (step 823). Then, the write data management table 17 is referenced to check if there are other files that require copying (step 825). If there are such files, processing from step 805 forward is carried out repetitively. If no such files exist, the transfer processing is ended.

When in step 805 or step 820, a file to be copied is selected form the write data management table 17, based upon a review of information in memory that indicates file positions in the magnetic tape cartridges 22 and 32 so that a selection file is made in a way that minimizes the time it takes to locate the source and destination files.

As described above, when the utilization of the read/write apparatus 20 is high, write data is temporarily recorded in a storage that does not perform automatic mounting of data storage units so that the handlers and the read/write apparatus capable of automatic mounting of data storage units by the handlers can be used with priority for handling those data storage units containing data to be read that require their being transported from the shelf. This increases the apparent number of the read/write apparatus capable of automatic mounting by an amount equal to the number of files involved in write requests, thereby improving the system throughput and reducing the probability of deadlock.

The read/write apparatus that do not perform automatic mounting need not have an interface with the handlers, so that there are no location restrictions that require these apparatus to be installed within the operation range of the handlers. This helps avoid the following undesired situation. That is without the present invention, if the number of read/write apparatus is increased in an effort to increase the amount of information recorded per unit of time, the proportion of the write only files necessarily increases leading to stagnant data recording in the common information storage devices or to the write data being recorded to full capacity, making it impossible to mount read files into the read/write apparatus with automatic mounting capability on a priority basis. Moreover, because such additional automatic mounting, such as interfaces with handlers, are not needed with the present invention, the read/write apparatus can be increased with low cost.

While this embodiment uses a magnetic tape contained in a magnetic tape cartridge as a data storage unit, other data storage units such as optical disks and magnetic disks may also be used as long as they are transportable. When these storage devices are used, the read/write apparatus each can serve as a read/write apparatus for each storage device. The read/write apparatus with automatic mounting capability and those without such capability need not use the same kind of data storage unit. In this case, the data storage units used in the read/write apparatus without automatic mounting capability may not be transportable, for example, semiconductor memory devices may be used as the data storage unit 32.

Although the advantage of being free from restrictions on installation location is lost, it is possible to allocate a part of the read/write apparatus 20, that have automatic mounting capability through interfaces with handlers, as one or more of the apparatus 30 in which to mount common data storage units 32.

This invention offers the following advantages. In an automatic library system for data storage units such as magnetic tapes and optical disks, when the utilization of first read/write apparatus, which are associated with handlers that carry data storage units from a storage shelf for automatic mounting, is high, write only data files are temporarily recorded in a common storage in a second read/write apparatus that does not necessarily perform automatic mounting. When the utilization of the first read/write apparatus becomes low, the temporarily stored data is automatically transferred to the data storage unit in which the data should normally be stored. This permits the priority use of the handlers and the first read/write apparatus for handling the data storage units containing read data that are required to be transported from the shelf. Therefore, for the higher-level systems, it looks as if the number of read/write apparatus has increased from the actual numbers by an amount equal to the number of data write files. This in turn reduces the chances of file waiting, thereby improving the system throughput.

While a preferred embodiment has been set forth with specific details, further embodiments, modifications and variations are contemplated according to the broader aspects of the present invention, all as determined by the spirit and scope of the following claims.

We claim:

1. A data storage unit library system to automatically operate with a higher-level system, comprising:

a holder to store a plurality of the transportable data storage units;

a plurality of read/write apparatus;

handlers to carry the data storage units between the holder and the read/write apparatus to write/read data to/from files in the data storage units;

a storage device having files therein;

means to record utilization of the read/write apparatus;

means responsive to a mount request for one of the data storage units from the higher level system and responsive to the utilization being higher than a predetermined value, for mounting the storage device in the read/write apparatus instead of the one of the data storage units and for informing the higher-level system of successful mounting;

means to record a file identifier of a file in the storage device in correlation with a data storage unit identifier identifying the one of the data storage units;

means to record data in the storage device in response to the mount request from the higher-level system; and transfer means, responsive to the file identifier and the data storage unit identifier, for mounting the one of the data storage units in the read/write apparatus at an arbitrary time, with respect to the higher-level system, and for transferring the data from the storage device to the requested one of the data storage units.

2. The library system according to claim 1, wherein the storage device records a plurality of the files with respect to different ones of the requests.

3. The library system according to claim 2, wherein the transfer means transfers all data recorded in the storage device in files correlated to the one of the data storage units at one mounting.

4. The library system according to claim 1, wherein the read/write apparatus include a first read/write apparatus cooperating with the handlers so as to receive the data storage units stored by the holders as transported by the handlers, and a second read/write apparatus that does not cooperate with the handlers and that mounts the storage device.

5. The library system according to claim 4, further including means, responsive to a data read request from the higher-level system that identifies a data storage unit in the holder, when read data requested in a read request from the higher-level system is contained in a storage device mounted in the second read/write apparatus, for switching the second read/write apparatus from recording data to reading the read data to the higher-level system.

6. The library system according to claim 1, wherein each of the read/write apparatus has an interface with the handlers, and at least one of the interfaces of one of the read/write apparatus preferentially mounts the storage device.

7. The library system according to claim 1, wherein each of the read/write apparatus has an interface with the handlers and at least one of the interfaces of one of the read/write apparatus exclusively mount the storage device.

8. In a data storage method automatically performed by a library system including a holder accommodating a plurality of transportable data storage units, a plurality of read/write apparatus, and handlers to carry the data storage units between the holder and the read/write appartus to write/read data to/from files generated in the data storage units, the method further comprising the steps of:

checking for the presence or absence of an idle read/write apparatus in which one of the data storage units can be mounted, in response to a read request from a higher-level system to mount the one of the first data storage units for reading first data;

when an idle read/write apparatus is absent, checking for the presence of a write busy second read/write apparatus in which a second of the data storage units is mounted for only writing of second data; and when the write busy second read/write apparatus is present suspending the writing to the second data of the second of the data storage units, and finishing the writing of the second data to a temporary storage, carrying the second of the data storage units by the handlers to the holder, carrying the one of the data storage units from the holder by the handlers and mounting in the one of the data storage unit in the second read/write apparatus for reading of the first data, holding an identifier of the second of the data storage units, an identifier of the temporary storage, and an identifier on the positions in the temporary storage at which the writing of the second data was recorded by said finishing, at an arbitrary time, mounting the second of the data storage units in a read/write apparatus, and thereafter transferring the second data recorded in the temporary storage to the second of the data storage units according to the identifiers.

9. A data storage unit library system, comprising:

a holder to store transportable data storage units;

first read/write apparatus to mount a first transportable data storage unit to read/write data;

means to transport the data storage units between the holder and the first read/write apparatus;

second read/write apparatus having a data storage other than the transportable data storage units and which data storage is not transported by the means to transport, and to read/write data to/from the data storage; and control means for controlling the first and second read/write apparatus and the transport means according to requests from a higher-level system;

wherein the control means is for controlling;

accepting a mount request from the higher-level system to mount the first transportable data storage unit, deciding whether an access mode of the mount request is a data write only of a write request, when the access mode is the data write only, informing the higher-level system of a successful mount, writing data into the data storage according to the write request, at an arbitrary time with respect to said informing, mounting the first transportable data storage unit into the first read/write apparatus, and thereafter transferring the data recorded in the data storage to the first transportable data storage unit device.

10. A magnetic tape library system according to claim 9, wherein the control means includes means for recording a utilization of the first read/write apparatus, and means responsive to the utilization for deciding whether or not to use the second read/write apparatus.

11. In a method for automatically controlling the operation of a library system having a plurality of read/write apparatus for automatically mounting transportable data storage units in response to read requests and write requests from a higher-level data handling system, wherein the requests directly or indirectly each identify a requested data storage unit, wherein the improvement comprises the method further including the following steps for alleviating read/write contention of the read requests and the write requests using the read/write apparatus, said steps comprising:

monitoring utilization of the read/write apparatus to determine when the utilization is high, as determined by the utilization being above a predetermined threshold, below which the contention is normally not a problem;

responding to a write request from the higher-level system when the utilization is not high, by transporting a requested data storage unit to the read/write apparatus for mounting and writing;

responding to a read request from the higher-level system by transporting a requested data storage unit to the read/write apparatus for mounting and reading;

responding to a write request from the higher-level system when utilization is high, by writing to a temporary storage location without said step of transporting, and recording a correlation between the temporary storage location and a requested data storage unit; and when the utilization is not high, transporting a data storage unit identified by the correlation to a read/write apparatus for mounting, copying data from the temporary storage location identified by the correlation to the data storage unit, and erasing the correlation.

12. The method of claim 11, further including the steps of:

wherein said responding to a read request includes discontinuing execution of a write request when all the read/write apparatus are busy, temporarily writing data of the write request to a second temporary storage location, recording a second correlation between the data at the second temporary storage location and the data storage unit associated with the write request, removing the data storage unit associated with the write request from the associated read/write apparatus, and completing execution of the read request with the associated read/write apparatus; and thereafter when the utilization is not high, transporting a data storage unit identified by the second correlation to a read/write apparatus for mounting, and copying data identified by the second correlation from the second temporary storage location identified by the correlation to the data storage unit identified by the second correlation, and thereafter erasing the second correlation.

13. The method of claim 11, further including maintaining a file management table including correlation between file identification, data storage unit identification, read request or write request identification, read/write apparatus identification, whether data storage unit transporting is involved, user identification, and user flag, for each of the read requests and write requests from the higher-level system.

14. The method of claim 12, further including the step of maintaining a write data management table including read/write apparatus identification, file identification, data storage unit identification, and information concerning interrupted execution of a write request sufficient to resume the write request.

15. The method of claim 11, further including recording on and reading from the data storage unit a file identification and data, in said responding to each write request and read request, respectively.

16. The method of claim 11, wherein said step of responding to a read request first checks if the requested data storage unit is mounted in a read/write apparatus and bypasses said steps of transporting and mounting when the result of such checking is positive.

17. The method of claim 11, wherein said step of responding to a write request first checks if the requested data storage unit is mounted in a read/write apparatus and bypasses said steps of transporting and mounting when the result of such checking is positive.

18. The method of claim 17, wherein said step of responding to a read request first checks if the requested data storage unit is mounted in a read/write apparatus and bypasses said steps of transporting and mounting when the result of such checking is positive; and further including recording on and reading from the data storage unit a file identification and data, in said responding to each write request and read request, respectively.

19. The method of claim 18, further including the steps of:
wherein said responding to a read request includes discontinuing execution of a write request when all the read/write apparatus are busy, temporarily writing data of the write request to a second temporary storage location, recording a second correlation between the data at the second temporary storage location and the data storage unit associated with the write request, removing the data storage unit associated with the write request from the associated read/write apparatus, and completing execution of the read request with the associated read/write apparatus; and thereafter when the utilization is not high, transporting a data storage unit identified by the second correlation to a read/write apparatus for mounting, and copying data identified by the second correlation from the second temporary storage location identified by the correlation to the data storage unit identified by the second correlation, and thereafter erasing the second correlation.

20. The method of claim 19, further including the step of maintaining a write data management table including read/write apparatus identification, file identification, data storage unit identification, and information concerning interrupted execution of a write request sufficient to resume the write request.

21. The method of claim 20, further including maintaining a file management table including correlation between file identification, data storage unit identification, read request or write request identification, read/write apparatus identification, whether data storage unit transporting is involved, user identification, and user flag, for each of the read requests and write requests from the higher-level system.

22. A data storage library system to operate with a higher-level system, comprising:
a holder to store a plurality of transportable data storage units;

a plurality of read/write apparatus to write/read data to/from files in the data storage units;

handlers to carry the data storage units between the holder and the read/write apparatus;

a data storage device;

means to record utilization of the read/write apparatus;

means, responsive to a write from the higher level system and the utilization higher than a predetermined value, for writing data of the write request to a temporary file in the data storage device, for informing the higher-level system of successful writing, and for recording a correlation between a file identifier of the temporary file in the data storage device and a storage device identifier of any of the data storage units referenced by the write request; and means, thereafter responsive to the utilization being lower than the predetermined value, for controlling the handlers and mounting a data storage unit corresponding to the storage device identifier in a read/write apparatus at an arbitrary time with respect to the time of the request, for transferring data from the temporary file in the data storage device to the data storage unit.

23. The system according to claim 22, wherein the data storage device records a plurality of temporary files.

24. The system according to claim 22, wherein the read/write apparatus includes a first read/write apparatus for mounting the data storage units stored by the holder and transported by the handlers, and a second read/write apparatus that does not mount the data storage units and does mount the data storage device.

25. The system according to claim 24, wherein there are plural second read/write apparatus; and means responsive to requested read data of a read request being in a data storage device mounted in one of the second read/write apparatus, for switching the one of the second read/write apparatus from writing to reading in response to a read request to a specific first read/write apparatus from the higher-level system.

26. In a data storage method automatically performed by a library system including a holder accommodating a plurality of transportable data storage units, a plurality of read/write apparatus, and handlers to carry the data storage units between the holder and the read/write apparatus to write/read data to/from files generated in the data storage units, the method further comprising the steps of:

checking for the presence or absence of an idle first read/write apparatus in which a first data storage unit can be mounted, in response to a request from a higher-level system to mount the first data storage unit;

in response to said checking having an absence result, determining the presence of a second read/write apparatus in which a second data storage unit is mounted for only writing; and when said determining has a result of presence, completing the writing to a temporary file in a temporary storage, carrying the second data storage unit by the handlers to the holder, carrying the first data storage unit from the holder and mounting the first data storage unit in the second read/write apparatus, holding a correlation between an identifier of a file in the second data storage unit into which data is to be written, an identifier of the temporary file and write resumption position information on a position in the second data storage unit at which data recording is to be resumed, and at an arbitrary time, transferring data recorded in the temporary file to the second data storage unit according to the identifiers and the write resumption position information.

27. A method automatically performed by a data storage unit library system comprising a holder to store a plurality of transportable first data storage units, first read/write apparatus to mount the first data storage unit to read/write information, a handler to transport the data storage units between the holder and the read/write apparatus, and second read/write apparatus to mount a second data storage unit that is not transported by the handler and to read and write information to/from the second data storage unit, said method controlling the first and second read/write apparatus and the handler according to requests from a higher-level system to perform the steps of:

accepting a request from the higher-level system to access one of the first data storage units and transfer data;

deciding whether the access of the request is a data write only;

when said deciding has found that the access is the data write only, informing the higher-level system of a successful mount;

writing the data into the second data storage unit according to the request;

at an arbitrary subsequent time, mounting the one of the first data storage units into the first read/write apparatus by using the handler; and transferring the data of said writing step from the second data storage unit to the one of the first data storage units.

28. The method according to claim 27, further including recording a utilization of the first read/write apparatus and, based on the utilization, deciding whether or not to use said steps of writing, mounting and transferring.

* * * * *